United States Patent
Samuel et al.

(10) Patent No.: US 11,797,370 B2
(45) Date of Patent: Oct. 24, 2023

(54) OPTIMIZED DIAGNOSTICS PLAN FOR AN INFORMATION HANDLING SYSTEM

(71) Applicant: Dell Products L.P., Round Rock, TX (US)

(72) Inventors: Balasingh P. Samuel, Round Rock, TX (US); Vivek Viswanathan Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/241,982

(22) Filed: Apr. 27, 2021

(65) Prior Publication Data

US 2022/0342738 A1 Oct. 27, 2022

(51) Int. Cl.
*G06F 11/07* (2006.01)
*G06N 20/00* (2019.01)

(52) U.S. Cl.
CPC ........ *G06F 11/079* (2013.01); *G06F 11/0709* (2013.01); *G06N 20/00* (2019.01)

(58) Field of Classification Search
CPC .... G06F 11/079; G06F 11/0709; G06N 20/00
See application file for complete search history.

(56) References Cited

U.S. PATENT DOCUMENTS

| 9,612,899 | B2* | 4/2017 | Della Corte | G06F 11/0715 |
| 10,169,137 | B2* | 1/2019 | Cain | G06F 11/0721 |
| 10,667,130 | B2* | 5/2020 | Bolte | H04W 12/06 |
| 2021/0049063 | A1* | 2/2021 | Reed | G06F 11/0793 |
| 2022/0174502 | A1* | 6/2022 | Kounev | H04W 24/04 |

* cited by examiner

*Primary Examiner* — Nadeem Iqbal
(74) *Attorney, Agent, or Firm* — Jackson Walker L.L.P (57) ABSTRACT

A diagnostics optimization platform employs cloud-based resources, including a diagnostics repository that accumulates health data from managed endpoints, and machine learning (ML) resources that generate endpoint-specific diagnostic plans based on the accumulated health data. The ML resources may be configured to generate diagnostic plans that prioritize any appropriate diagnostic testing parameter or objective including, as a non-limiting example, a reduction in diagnostic testing execution time and/or diagnostic testing frequency. The ML resources may maintain a continually updated training database derived from the collected health data to develop endpoint-specific data collection and diagnostic testing models. The ML resources may include a diagnostics optimization module to develop diagnostic testing models and provide corresponding endpoint-specific diagnostic plans to each endpoint. The ML resources may further include a data collection module to develop data collection models and generate endpoint-specific data collection plans for each of the managed endpoints.

20 Claims, 4 Drawing Sheets

| Trigger point | Data collection |
|---|---|
| Incomplete boot 126 | Memory health |
| | Hard driver health |
| 124 | GPU health |
| | CPU health |
| | Temperature by stressing GPU |
| After firmware update 127 | Memory |
| | Cable |
| | Fan |
| OS update 128 | HDD |
| | Power delivery |

121-1

| Trigger point | Data collection |
|---|---|
| Incomplete boot 126 | Memory health of first 16GB |
| 124 | Hard drive health |
| | Battery |
| After firmware update 127 | WiFi radio strength |
| | Cable |
| | Fan |
| OS update 128 | HDD |
| | CPU |

Endpoint Subsystem Static Input
  Peripheral ID / vendor
  Memory ID / vendor
  CPU ID / vendor
  Storage ID / vendor
Endpoint Subsystem Dynamic Input
  Subsystem_name: usage
  Subsystem_resource: usage
  Subsystem_thermal: usage
App/OS/User
  Foreground / Background App
  Services / Processes
  Time of Day
  Calendar / Schedule
  System Settings
Environmental Inputs
  Ambient Sound
  Ambient Lighting
  Weather
  Events

| Input | | | | | | Output | | |
|---|---|---|---|---|---|---|---|---|
| System Model No | Memory mfg/ serial no | Mean temp | Usage intensity | Memory training frequency | CPU frequency | Algorithm code | Memory segmentation/region | OS environment |
| XPS 9380 | Mfg 1 | 90 degree C | heavy | 3 for last 90 days | 3.4 GHz | 7,1,5,3,2,5,4 | Last, middle, first | Preboot |
| XPS 7390 | Mfg 2 | 70 degree C | medium | 1 for the last 90 days | 2.9 GHz | 3,4,1,7,2,5,6 | First, last, middle | Host OS |

262, 263, 264, 265, 266, 267, 272, 273, 274 — 261 (Input) / 271 (Output)

OPTIMIZED DIAGNOSTICS PLAN FOR AN INFORMATION HANDLING SYSTEM

TECHNICAL FIELD

The present disclosure relates to information handling systems and, more particularly, diagnostics performed on information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Modern computer systems feature a complex combination of device subsystems including processing subsystems, storage subsystems, management subsystems, power subsystems, cooling subsystems, etc., all of which must be maintained and supported. This complexity will only increase as existing subsystems evolve and new subsystems are added to computer system platforms. In addition, for a computer manufacturer that supports a build-to-order model, the number of computer system configurations and permutations increases substantially.

All of this variability and differentiation can complicate diagnostics strategy and negatively affect customer experience if diagnostics are slow, inaccurate, incomplete, unstable, inefficient, or otherwise suboptimal.

Existing diagnostic strategies tend to rely on passive test models that unnecessarily uses multiple static and ineffective test algorithms. In addition, current diagnostics greatly depend on the subsystem manufacturer and the specific device combinations implemented within a particular system. This reliance can render it difficult to distinguish hardware issues from software problems. In addition, the sheer number of configurations and technology additions increases the diagnostic duration.

The realities discussed above may negatively impact customer experience and may result in repeated tech support calls and multiple field replacement unit dispatches and tremendously increase support costs.

SUMMARY

In accordance with teachings disclosed herein, common problems associated with conventional diagnostic testing paradigms are addressed by a diagnostics optimization (DO) method and platform disclosed herein.

A disclosed method of managing diagnostic testing of information handling system endpoints employs cloud-based resources, including a diagnostics repository that accumulates health data from a group of managed endpoints, and machine learning resources that generate endpoint-specific diagnostic plans, referred to herein as optimized diagnostic plans, based on the accumulated health data. The machine learning resources may be configured to generate optimized diagnostic plans that prioritize any appropriate diagnostic testing parameter or objective including, as a non-limiting example, a reduction in diagnostic testing execution time and/or diagnostic testing frequency. In at least some embodiments, the platform may extend the machine learning resources to encompass, not only the health data provided by the endpoints, but also the optimized data plans themselves. In this manner, the machine learning resources might address, for example, clusters of optimized data plans exhibiting similar issues.

Exemplary embodiments of the machine learning resources maintain a continually updated training database derived from the collected health data to develop endpoint-specific data collection and diagnostic testing models. The machine learning resources may include a diagnostics optimization module to develop one or more diagnostic testing models and provide one or more optimized diagnostic plans to each endpoint. The machine learning resources may further include a data collection module to develop one or more data collection models and generate one or more endpoint-specific data collection plans for each of the managed endpoints.

Optimized diagnostic plans and endpoint-specific data collection plans may include plans for each of one or more endpoint subsystems such as processing subsystems, memory subsystems, storage subsystems, power subsystems, thermal subsystems, and so forth. Optimized diagnostic plans and endpoint-specific data collection plans may also include distinct plans for different operational contexts including, as non-limiting examples, a preboot context, a host OS context, and a service OS context. The ability to differentiate diagnostics based on the operational context may be useful to distinguish hardware and software issues. For example, an algorithm that tends to identify issues traceable to a software configuration may be omitted from preboot diagnostic plans.

Optimized diagnostic plans identify an endpoint-specific set of diagnostic testing algorithms for each of one or more endpoint subsystems as well as endpoint-specific sequences for performing the specified algorithms. Accordingly, the diagnostic plan for a particular subsystem of a particular endpoint may include any combination and sequence of two or more diagnostic testing algorithms appropriate for the particular subsystem, thus enabling the platform to omit selected algorithms under appropriate conditions and thereby reduce diagnostic testing execution time. In this manner, the diagnostic testing performed on two identically or similarly configured endpoints may differ based on any number of differentiating parameters such as loading, environmental conditions, etc.

The DO platform may generate health weighting factors, based on various parameters including past, present, and/or anticipated usage information, that influence the optimized diagnostic plans. The usage information may be indicative of an anticipated usage of a particular subsystem during a particular future interval.

Each endpoint may include one or more data collection managers to implement the applicable data collection plans. Each data collection manager may be configured to collect and store health data in accordance with the endpoint-specific data collection plan for the corresponding endpoint. Each endpoint may further include a service to ensure to retrieve and implement the optimized diagnostic plans generated by the machine learning resources.

Each optimized diagnostic plan is specifically tuned to detect hardware and/or software issues quickly and efficiently based, at least in part, on an anticipated future load of the endpoint or one or more endpoint subsystems. In this manner, the optimized diagnostic plans detect problems efficiently and pro-actively to thereby improve end-user experience and productivity. Each data collection plan may indicate one or more trigger points and, for each trigger point, one or more data collection parameters.

The diagnostic plan component for a particular subsystem of a particular endpoint may indicate an operating system environment in which the diagnostic plan component may be executed. The endpoint may support multiple operating system environments including, as non-limiting examples, a host OS environment, a service OS environment, and a BIOS or pre-boot environment.

The creation of optimized diagnostic plans may be influenced by one or more administrative policies designed to prioritize one or more objectives. In at least one embodiment, a first prioritized objective may prioritize the average execution duration of the optimized diagnostic plan and a second prioritized objective may prioritize a reduction in productivity interruptions.

In an exemplary embodiment, each subsystem reports its health following each of one or more pre-boot and run time trigger points. Data collection triggers points may include, firmware updates, configuration modifications, OS updates, incomplete boot sessions, and so forth. Data collection is endpoint specific to improve efficiency and speed and reduce or eliminate productivity interruptions.

In at least one embodiment, a cloud-based analytics engine sends the data collection plans as metadata indicating a data collection strategy for each endpoint. The analytics engine generates the metadata for each endpoint based on the collective parameters across many supported systems including, as examples, all endpoint devices associated with an enterprise, all in-service endpoint devices from a particular maker of computer systems, etc. The data collection plans are continually updated based on one or more trends including trends specific to a particular system in the field and similar systems in the field. The collection of health data may leverage existing telemetry capabilities of the applicable endpoints.

Examples of data that may be collected include static information, such as vendor part numbers for processors, memory, HDD, etc., historical mean time to failure information; real-time information indicative of subsystems, apps, and contexts currently in use and how frequently and extensively the user invokes specific subsystems, apps, and contexts environmental information (e.g., audio usage, lighting, thermal, etc.); weighted health score information by the system under consideration and similarly configured systems; and failure statistics for same model numbers, component types, batch type, etc.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Exemplary embodiments and their advantages are best understood by reference to FIGS. 1-7, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOS), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Figure 1:
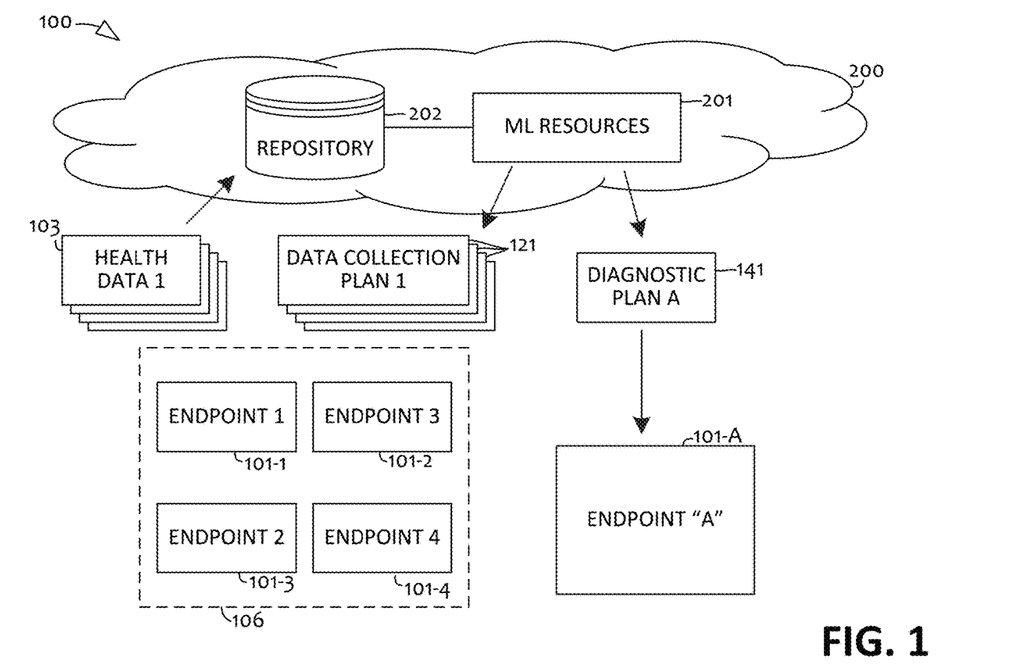
FIG. 1 illustrates a high level block diagram of a DO platform.

FIG. 1 is a high level block diagram of a DO platform 100 suitable for generating diagnostic plans that are optimized or otherwise specific to one or more managed information handling systems, referred to herein as endpoint devices, endpoint systems, or more simply, and endpoints. As depicted in FIG. 1, DO platform 100 includes a group of two or more managed endpoints 101, four of which are depicted in FIG. 1 as endpoints 101-1, 101-2, 101-3, and 101-4, communicatively coupled to cloud based resources referred to herein simply as cloud resources 200. The cloud resources 200 illustrated in FIG. 1 include machine learning resources 201, described in more detail in FIG. 2) and an associated database server referred to herein simply as diagnostics repository 202.

In at least one embodiment, the endpoints 101 illustrated in FIG. 1 are members of an endpoint group 106 corresponding to the managed devices, or a subset of the managed devices of an enterprise. Endpoints 101 may include a heterogeneous mixture of different device types including, as non-limiting examples, two or more makes and models of laptop computers, two or more makes and models of desktop computers, two or more tablet devices, and so forth.

Endpoints 101 send information to and receive information from cloud resources 200. As depicted in FIG. 1 endpoints 101 send health data 103 to diagnostics repository 202. Health data 103 includes any information indicative of a static or dynamic parameter, characteristic, condition, configuration, attribute, or state associated with an endpoint 101 or with any of one or more subsystems (not explicitly depicted in FIG. 1) of endpoint 101. As further depicted in FIG. 1, ML resources 201 generate and send at least two types of information to endpoints 101. The two types of information illustrated in FIG. 1 include endpoint-specific data collection plans 121 and optimized diagnostic plans 141.

In at least one embodiment, each endpoint 101 reports health data 103 to cloud resources 200 in response to scheduled and/or triggered events. In some embodiments, the scheduled and/or triggered events occur as frequently as possible without negatively impacting end user productivity or experience. Examples of events or triggers that may initiate the reporting of health data include, as non-limiting examples, the first boot after a firmware update, detecting a system configuration modification, before and/or after an operating system update is performed, an incomplete boots session, or a trigger based on contextual data.

Figure 2:
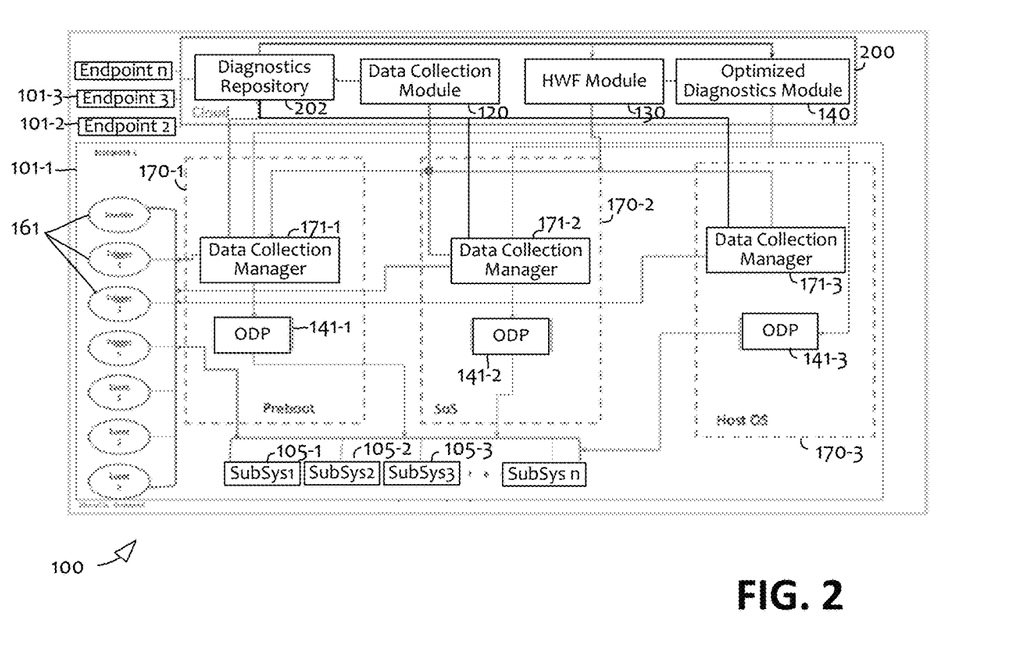
FIG. 2 illustrates additional detail of the optimized diagnostic platform.

FIG. 2 illustrates additional detail of the DO platform 100 illustrated in FIG. 1. The DO platform 100 illustrated in FIG. 2 includes a plurality of endpoints 101, three of which are indicated by reference numerals 101-1, 101-2, and 101-3. Endpoints 101 are communicatively coupled to cloud resources 200. The cloud resources 200 illustrated in FIG. 2 include the diagnostics repository 202, a data collection module 120, an AI engine 130 for creating health weighting factors, and an optimal diagnostics plan module 140. FIG. 2 further illustrates a number of triggers or events 161 defined for each endpoint 101. Some embodiments of DO platform 100 may employ a uniform set of trigger events 161 across all monitored endpoints 101. In other environments, each endpoint 101 may have its own set of endpoint-specific triggers 161.

Each endpoint 101 illustrated in FIG. 2 includes one or more data collection managers 171 and one or more optimized diagnostic plans 141. In the illustrated platform, a first endpoint 101-1 includes a data collection manager 171-1 corresponding to pre-boot context 170-1, a data collection manager 171-2 associated with a service OS context 170-2, and a data collection manager 171-3 corresponding to a host OS context 170-3. Similarly, each endpoint 101 includes an optimized diagnostic plan 141 corresponding to each of the operating system contexts shown. Thus, for example, first endpoint 101-1 includes a first optimized diagnostic plan 141-1 associated with pre-boot context 170-1, a second optimized diagnostic plan 141-2 is associated with service operating system context 170-2, and a third optimized diagnostic plan 141 is associated with host operating system context 170-3.

FIG. 2 further illustrates each endpoint 101 is comprised of one or more subsystems 105. Subsystems 105 may refer to any hardware or software configuration that provides functionality to endpoint 101. Pervasive examples of such sub systems may include processing sub systems, storage sub systems, and so forth.

Data collection manager 171 may be responsible for monitoring subsystems 105 and triggers 161 to identify conditions in which health data should be reported to diagnostics repository 202. In at least some embodiments, each data collection manager 171 operates in accordance with an endpoint-specific data collection plan (not explicitly depicted in FIG. 2) generated by and/or received from data collection module 120.

As suggested above, the telemetry data 103 reported by each endpoint 101 is, in at least some embodiments, specific to and optimized for each endpoint based on data collection plans 121 provided to each endpoint 101. In at least one embodiment, the endpoint-specific data collection plans 121 include meta-data comprising a set of instructions for a data collection strategy for each endpoint device 101.

In at least one embodiment, not explicitly depicted in FIG. 2, DO platform 100 may be configured wherein optimized data plans 141 are not only pushed out to endpoints 101 for execution, but are also forwarded to diagnostics repository 202, along with the health data 103, to enable machine learning resources 201 to discover, for example, efficiencies that may correlate with or be otherwise influenced by the structure and content of the optimized data plans and to refine the optimized data plan models accordingly.

Figure 3:
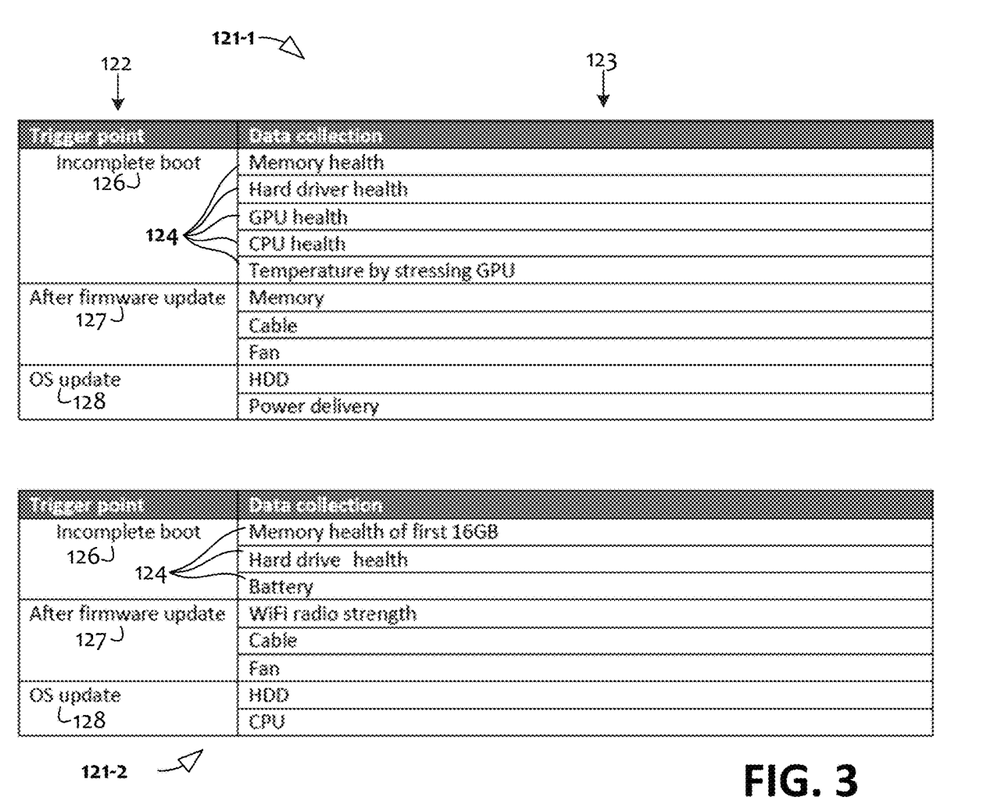
FIG. 3 illustrates exemplary endpoint-specific data collection plans.

Referring now to FIG. 3, two examples of endpoint-specific data collection plans 121 are illustrated. Each endpoint-specific data collection plan 121 illustrated in FIG. 3 is represented as a table with each table including a column 122 for indicating a particular trigger point or event and a column 123 for indicating one or more data collection parameters to be measured and reported in response to the applicable trigger point. For example, the first endpoint-specific data collection plan 121-1 illustrated in FIG. 3 indicates a set of five data collection parameters 124 to be measured and recorded in response to an incomplete boot event 126.

The five data collection parameters 124 illustrated in FIG. 3 include a memory health parameter, a hard drive health parameter, a graphics processing unit (GPU) health parameter, a central processing unit (CPU) health parameter, and a temperature parameter associated with a distressed GPU. It will be readily apparent to those of ordinary skill that the specific data collection parameters 124 illustrated in FIG. 3 is exemplary and that any of a wide variety of parameters may be included. The illustrated endpoint-specific data collection plan 121-1 further illustrates a set of three data collection parameters (memory, cable, and fan) measured in response to a firmware update trigger 127, as well as two data collection parameters (HDD and Power delivery) measured in response to an OS update trigger point 128.

FIG. 3 further illustrates a second endpoint-specific data collection plan 121-2 which includes the same set of trigger points 122 as data collection plan 121-1, but identifies a distinct set of data collection parameters 124 for each of the corresponding trigger points. Both of the endpoint-specific data collection plans 121 illustrated in FIG. 3 may be applicable to endpoint devices that are equivalent or substantially equivalent in design and configuration. Nevertheless, their equivalent configurations notwithstanding, distinct data collection plans 121-1 and 121-2 have been generated by cloud-based resources 200 based on historical health data for not only these particular endpoints, but based also on other similar and/or dissimilar endpoints within the group 106 of managed endpoints. In this manner, if data collection plans 121-1 and 121-2 both correspond to equivalent or substantially desktop computers, the desktop computer associated with collection plan 121-1 may have a historical record of significantly more rigorous usage within varying and sometimes challenging environments while the laptop computer associated with data collection plan 121-2 may have a historical record of far less demanding usage in more stable environments.

As conveyed by the exemplary data collection plans 121 in FIG. 3, health data reported to cloud-based resources 200 may include static information such as vendor part numbers for various components or subsystems including as non-limiting examples a memory subsystem, a hard drive or other storage system subsystem. In some embodiments, a historical mean time to failure (MTTF) may be indicated for each parameter.

In addition to static information, health data 103 may encompass real time information including, as non-limiting examples, sub systems present, applications executing on the endpoint, and the frequency and duration of contexts in which the user engages most frequently. The health data may include conventionally monitored and available telemetry resources as well and environmental information including, as examples, audio and or video resource usage, available lighting, thermal conditions, and so forth.

In at least one embodiment, a health weightings factor (HWF) is generated for each endpoint or each endpoint subsystem based on a system resource heat map. For purposes of this disclosure, a system resource heat map may indicate the extent or frequency of usage of particular resources. In an exemplary embodiment, cloud-based resources 200 automatically predict a value of HWF for each endpoint 101 for the next "n" days based on end-user usage and other parameters across The enterprise. The HWF may be automatically optimized or otherwise refined for each system. Examples of how the HWF may be determined and how it may influence data collection and diagnostic activity include the following examples: if few memory cell failures are detected using conventional memory monitoring resources and heavy memory usage is expected for the next seven days, then the HWF for the memory subsystem may be increased. As another example, if the rate of "free block count" of non-volatile storage decreased to a certain threshold limit, then the HWF for the storage subsystem may be increased. As a third example, if the system mean temperature for the last X days are normal and not much usage is expected for the next seven days, then the hardware weighted factor for the thermal subsystem may be decreased. As a fourth example, data from a battery management unit (BMU) may be read only when the user is away from the system if the battery health is good.

Figure 4:
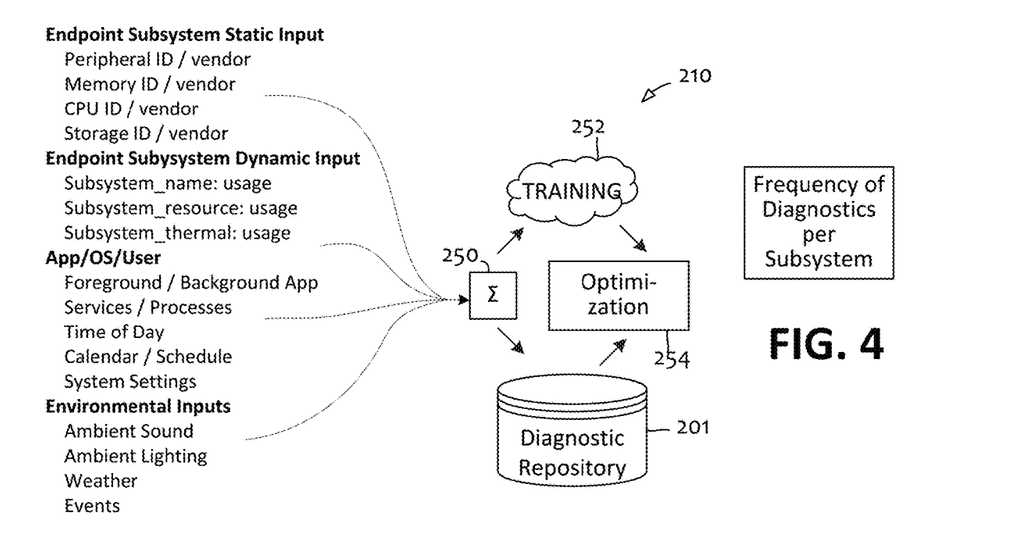
FIG. 4 illustrates the acquisition of health data within the diagnostics optimization platform.

Based on the telemetry data and the health weight is factors, cloud-based resources 200 create an optimized diagnostic plan 141 for referring to FIG. 4, and exemplary optimized diagnostic plan 141 is illustrated. In the optimized diagnostic plan 141 illustrated in FIG. 4, each and 101. The optimized diagnostic plans 141 are finally tuned specifically for each and point to detect hardware problems and software problems in the shortest and most efficient manner. The optimized diagnostic plan 141 may take into consideration anticipated or future loading of the system and thereby proactively detect problem conditions earlier to reduce and user productivity interruptions. that's, for example if heavy usage of hard drive storage is expected for the next seven days, then the hard drive threshold parameters including unused block may be automatically adjusted so that automatic FRU replacement may be expedited to meet end-user workload. In some embodiments, this feature may be associated with or tied to certain support levels offered by information handling system manufacturers. in specific embodiment, the optimized diagnostic plan generated by the cloud resources may include any one or more features such as choosing the right sequence or order of algorithms per sub system, along with which algorithms to run in which order and which ones to skip. In this embodiment, another feature of the optimized diagnostic plan is the ability to select the appropriate operating system environment within which diagnostic testing will be performed. in some instances, a particular diagnostic test store algorithm may be more appropriate for a host OS environment than for a service OS environment or a pre-boot environment. for example, it may be more appropriate to perform hardware diagnostics during a pre-boot sequence when any issues with the host operating system or other or firmware may be removed from consideration. in some instances, it may also be feasible for the optimize diagnostic plan to skip or omit diagnostic testing of one or more particular endpoint sub systems to expedite the diagnostic duration based on previous statistics and or a combination of weighted round robin method.

Referring now to FIG. 4, a service for the collection of health data 103 for training and inference by the ML resources 202 of FIG. 1 is illustrated. FIG. 4 illustrates various exemplary types of health data 103 that may be collected for use in generating optimized diagnostics plans and endpoint specific data collection plans. In the illustrated server 210, Collected health data is provided to a cloud-based accumulator 250, which is configured to store the data in diagnostics repository 202 and to forward some or all of the collected health data to a training module 252. An optimization module 254, coupled to training module 252 and the diagnostics repository. Training module 252 may be configured to train one or more ML-based classifiers in a machine learning model based on collected health data 103. Optimization module 254 may be configured to make recommendations based on one or more algorithms influenced by input from training model 252. In the context of optimized diagnostics, optimization module 254 may be configured to recommend an optimized diagnostic plan, program, or strategy for each endpoint. In at least some embodiments, the training of health data is ongoing and the accuracy of recommendation by optimization module 254 will most likely improve with time.

Figure 5:
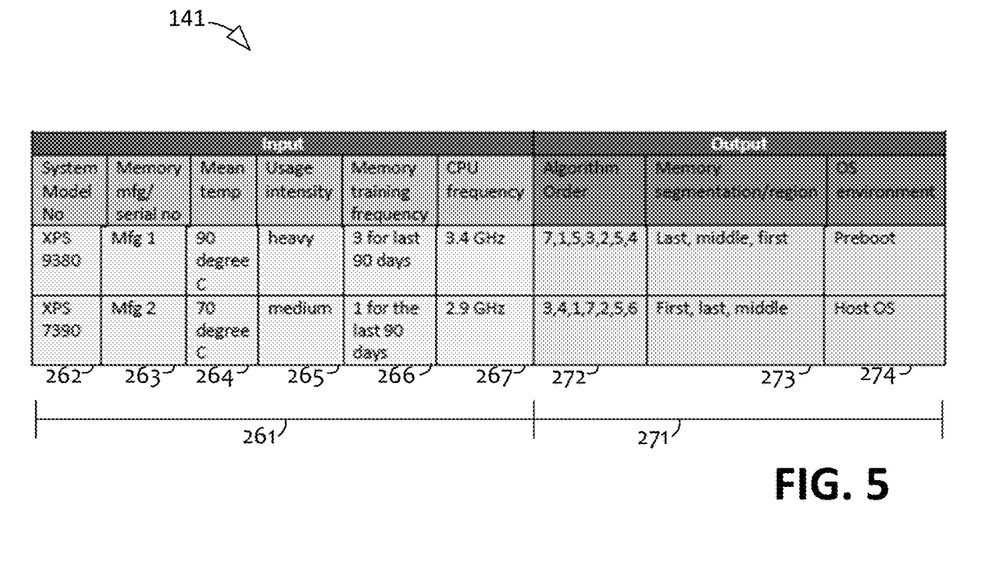
FIG. 5 illustrates a memory subsystem portion of an exemplary optimized data plan.

Referring now to FIG. 5, an exemplary memory subsystem excerpt of an optimized diagnostic plan 141 is illustrated. The illustrated optimized diagnostic plan 141 illustrated in FIG. 5 is represented as a table comprised of a set of input attributes 261, depicted on the left side of the illustrated table, and inferred attributes 262 on the right side. The input attributes 261 may include various static, dynamic, environmental, contextual, and other health data parameters such as the model number parameter 262, of the applicable system (endpoint), the memory manufacturer parameter 263 indicative of one or more manufacturers of the applicable memory device, a mean temperature parameter 264 indicative of a mean temperature of the applicable system, a usage intensity parameter 265, a training frequency parameter 266, and a CPU frequency parameters 267. The inferred parameters 271 illustrated in FIG. 5 include an algorithm parameter 272, a memory segment parameter 273, and an OS context parameter 274.

Figure 6:
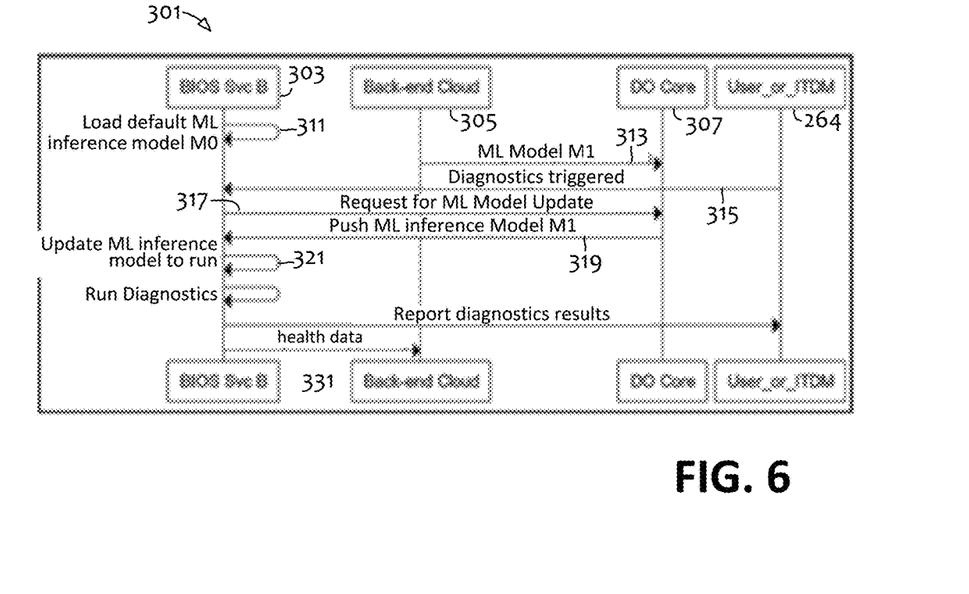
FIG. 6 illustrate a diagnostic testing execution flow.

FIG. 6 illustrates a diagnostic testing flow 301 in accordance with diagnostic optimization features disclosed herein. The flow 301 illustrated in FIG. 6 may be suitable for execution in multiple OS contexts and the endpoint may support one or more such flows for each applicable OS context. The participants of the flow 301 illustrated in FIG. 6 include a BIOS service 303, back-end cloud resources 305, a diagnostic optimization core 307, and a user or administrator 309. Throughout the flow 301, health data is collected from endpoints 101 and pushed (operation 331) to diagnostics repository 201 (not depicted in FIG. 6) in back end cloud resource 305. Initially, BIOS service 303 loads (operation 311) a default ML inference model (M0) as the diagnostic plan for testing an applicable subsystem within an applicable OS context in response to a scheduled or triggered event. While usage of the endpoint is ongoing, back-end cloud resources 305 continually evaluates health data inputs from the diagnostics repository (not depicted in FIG. 6) and inputs from a training module, such as the training model 252 illustrated in FIG. 4. Based on these inputs, which may be weighted in accordance with health weighting factors indicative of anticipated or expected usage, back-end cloud resources may generate a new inference model (M1) and forward (operation 313) the M1 inference model to diagnostic optimization core 307. The M1 inference model (M1) may remain with diagnostic optimization core 307 until diagnostics are triggered (operation 315) by a user or administrator identified in FIG. 6 as information technology decision maker (ITDM). In response to detecting the triggering of diagnostics, BIOS service 303 sends a request (operation 317) for ML model update to diagnostic optimization core 307. The diagnostic optimization core 307 pushes (operation 319) the M1 inference model back to BIOS service 303, which updates (operation 321) the ML inference model and executes (operation 323) the diagnostic testing corresponding to the M1 inference model.

Figure 7:
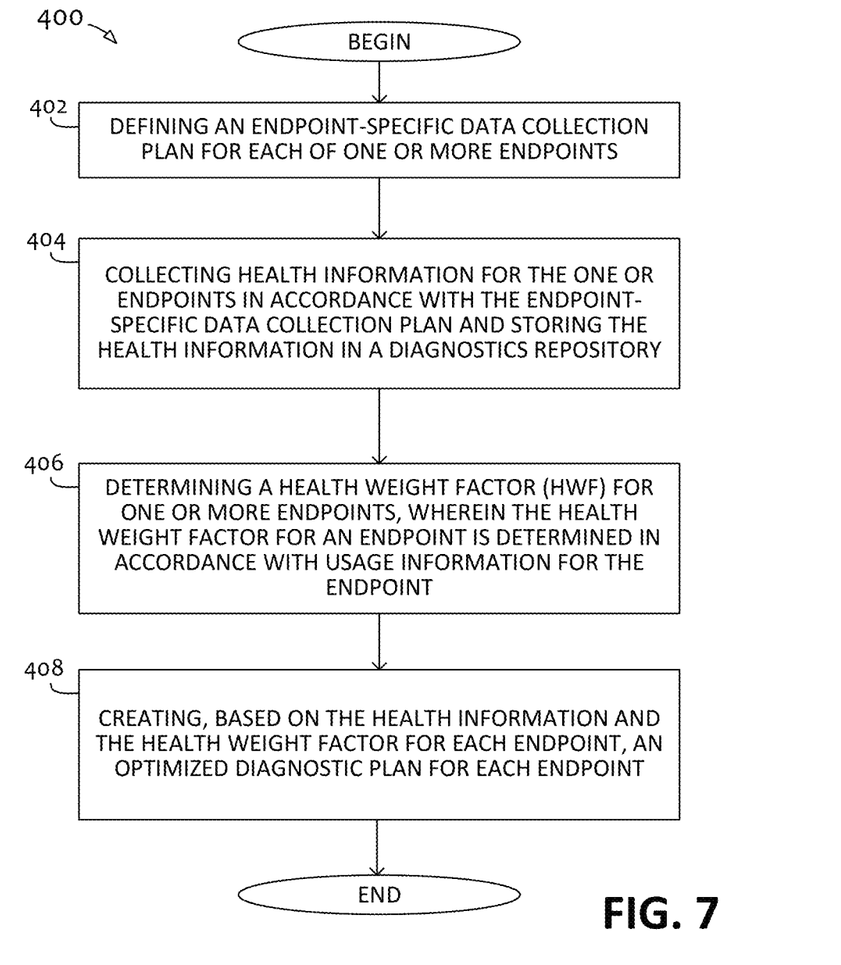
FIG. 7 illustrates a flow diagram of a diagnostic optimization method.

Referring now to FIG. 7, a flow diagram illustrates a diagnostic optimization method 401 in accordance with disclosed subject matter. The method 400 illustrated in FIG. 7 includes defining (operation 402) an endpoint-specific data collection plan for each of one or more endpoints. Health data is then collected (operation 404) from the endpoints in accordance with the endpoint-specific data collection plan. The health data is stored in a diagnostics repository. The method 400 illustrated in FIG. 7 then determines (operation 406) a heat weighing factor for some or all of the endpoints or endpoint subsystems. The health weighting factor for a particular endpoint may be determined in accordance with usage information for the endpoint. The usage information may include projected usage information, past and present usage information, or a combination thereof. Based at least in part on the health data and the health weight factor for each endpoint an optimized diagnostic plan for each endpoint may be established and implemented on the applicable endpoint.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method for managing diagnostic testing of one or more information handling systems, the method comprising:
determining an endpoint-specific data collection plan for each of one or more endpoints;
collecting health data for the one or more endpoints in accordance with the endpoint-specific data collection plan and storing the health data in a diagnostics repository;
determining a health weight factor (HWF) for one or more endpoints, wherein the health weight factor for an endpoint is determined, at least in part, in accordance with usage information for the endpoint wherein the usage information includes anticipated usage information indicative of an anticipated use of the endpoint; and
creating, based on the health data and the health weight factor for each endpoint, an optimized diagnostic plan for each endpoint, wherein the optimized diagnostic plan for each endpoint includes distinct plans for each of two or more operational contexts, the two or more operational contexts including a preboot context and a host operating system context.

2. The method of claim 1, wherein each data collection plan indicates one or more trigger points and, for each trigger point, one or more data collection parameters.

3. The method of claim 1, wherein the optimized diagnostic plan for a particular endpoint includes a diagnostic plan component for each of one or more subsystems of the endpoint.

4. The method of claim 1, wherein the anticipated usage information is indicative of an anticipated use of a particular subsystem during a particular future interval.

5. The method of claim 3, wherein the optimized diagnostic plan component for a particular subsystem of the particular endpoint indicates an endpoint-specific group of one or more diagnostic algorithms to perform.

6. The method of claim 5, wherein the group of one or more diagnostic algorithms to perform includes less than all diagnostic algorithms associated with the particular subsystem.

7. The method of claim 5, wherein the diagnostic plan component for the particular subsystem indicates an endpoint-specific sequence of the group of one or more diagnostic algorithms.

8. The method of claim 1, wherein the two or more operational contexts further include a service operating system context.

9. The method of claim 1, wherein creating the optimized diagnostic plan comprises creating the optimized diagnostic plan in accordance with an administrative policy, wherein the administrative policy prioritizes at least one prioritized objective and influences the optimized diagnostic plan.

10. The method of claim 9, wherein the at least one prioritized objective is selected from a first prioritized objective prioritizing an average duration of the optimized diagnostic plan and a second prioritized objective prioritizing a reduction in a frequency of diagnostic testing.

11. A diagnostic optimization platform for managing diagnostic testing of one or more managed endpoints, wherein each managed endpoint comprises an information handling system, the platform comprising:
a diagnostics repository to receive health data generated by the endpoints; and
machine learning resources, communicatively coupled to the diagnostics repository and the managed endpoints, to perform diagnostic optimization operations, wherein the diagnostic operations include:
determining an endpoint-specific data collection plan for each of one or more endpoints;
collecting health data for the one or more endpoints in accordance with the endpoint-specific data collection plan and storing the health data in the diagnostics repository;
determining health weight factors for each of the one or more endpoints, wherein the health weight factor for an endpoint is determined, at least in part, in accordance with usage information for the endpoint wherein the usage information includes anticipated usage information indicative of an anticipated use of the endpoint; and
creating, based on the health data and the health weight factor for each endpoint, an optimized diagnostic plan for each endpoint, wherein the optimized diagnostic plan specifies an endpoint-specific set of diagnostic testing algorithms, wherein the optimized diagnostic plan for each endpoint includes distinct plans for each of two or more operational contexts, the two or more operational contexts including a preboot context and a host operating system context.

12. The platform of claim 11, wherein each data collection plan indicates one or more trigger points and, for each trigger point, one or more data collection parameters.

13. The platform of claim 11, wherein the optimized diagnostic plan for a particular endpoint includes a diagnostic plan component for each of one or more subsystems of the endpoint.

14. The platform of claim 11, wherein the anticipated usage information is indicative of an anticipated use of a particular subsystem during a particular future interval.

15. The platform of claim 13, wherein the optimized diagnostic plan component for a particular subsystem of the particular endpoint indicates an endpoint-specific group of one or more diagnostic algorithms to perform.

16. The platform of claim 15, wherein the group of one or more diagnostic algorithms to perform includes less than all diagnostic algorithms associated with the particular subsystem.

17. The platform of claim 15, wherein the diagnostic plan component for the particular subsystem indicates an endpoint-specific sequence of the group of one or more diagnostic algorithms.

18. The platform of claim 15, wherein the two or more operating system contexts further include a service operating system (OS) context.

19. The platform of claim 11, wherein creating the optimized diagnostic plan comprises creating the optimized diagnostic plan in accordance with an administrative policy, wherein the administrative policy prioritizes at least one prioritized objective and influences the optimized diagnostic plan.

20. The platform of claim 19, wherein the at least one prioritized objective is selected from a first prioritized objective prioritizing an average duration of the optimized diagnostic plan and a second prioritized objective prioritizing a reduction in a frequency of diagnostic testing.

* * * * *